United States Patent
Juni

(10) Patent No.: US 7,805,036 B2
(45) Date of Patent: Sep. 28, 2010

(54) OPTICAL WAVEGUIDE DEVICE FOR TOUCH PANEL AND TOUCH PANEL USING THE SAME

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 185 days.

(21) Appl. No.: 12/267,936

(22) Filed: Nov. 10, 2008

(65) Prior Publication Data

US 2009/0128519 A1    May 21, 2009

Related U.S. Application Data

(60) Provisional application No. 61/012,620, filed on Dec. 10, 2007.

(30) Foreign Application Priority Data

Nov. 15, 2007   (JP)  .............................. 2007-297105

(51) Int. Cl.
  *G02B 6/32* (2006.01)
  *G02B 6/10* (2006.01)
  *G06F 3/042* (2006.01)

(52) U.S. Cl. .................... 385/33; 385/131; 345/175; 345/176

(58) Field of Classification Search ................... 385/12, 385/33, 129–132; 345/173, 175, 176
See application file for complete search history.

(56) References Cited

U.S. PATENT DOCUMENTS

| 7,099,534 | B2 | 8/2006 | Kato et al. | |
|---|---|---|---|---|
| 2004/0201579 | A1 | 10/2004 | Graham | |
| 2009/0102815 | A1* | 4/2009 | Juni | 345/175 |
| 2009/0237375 | A1* | 9/2009 | Khan et al. | 345/175 |

FOREIGN PATENT DOCUMENTS

JP     2003-004960 A    1/2003

* cited by examiner

*Primary Examiner*—Daniel Petkovsek
(74) *Attorney, Agent, or Firm*—Westerman, Hattori, Daniels & Adrian, LLP

(57) ABSTRACT

An optical waveguide device for a touch panel, including: a body; a plurality of cores formed on a surface of the body; and an over-cladding layer formed on the surface of the body to cover the plurality of cores, in which the over-cladding layer includes an end portion which covers each of the end surfaces of the cores, and the end portion of the over-cladding layer is formed as a lens portion. The lens portion includes a surface formed as an arcuately curved surface in side view which bulges outwardly, in which a distance (L) from the end surface of the cores to the center of curvature of the arcuately curved surface and the radius (R) of curvature of the arcuately curved surface satisfy the following condition (a):

$(L/2)-0.3 < R < (L/2)+0.3$    (a)

where L in mm, and R in mm.

4 Claims, 7 Drawing Sheets

RELATED ART

OPTICAL WAVEGUIDE DEVICE FOR TOUCH PANEL AND TOUCH PANEL USING THE SAME

RELATED APPLICATIONS

This application claims the benefit of U.S. Provisional Application No. 61/012,620, filed on Dec. 10, 2007, which is hereby incorporated by reference.

BACKGROUND OF THE INVENTION

1. Field of the Invention

The present invention relates to an optical waveguide device for a touch panel and a touch panel using the same.

2. Description of the Related Art

Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touched position detected by the detection means is sent in the form of a signal to the apparatus, which in turn performs an operation and the like displayed on the touched position. Examples of the apparatus employing such a touch panel include ATMs in banking facilities, ticket vending machines in stations, portable game machines, and the like.

A detection means employing an optical waveguide is proposed as the detection means for detecting the finger touch position and the like on the above-mentioned touch panel (see, for example, US 2004/0201579 A1) Specifically, the touch panel includes optical waveguides provided around a periphery of a display screen of a rectangular display, and is configured to emit a multiplicity of light beams parallel to the display screen of the display from an optical waveguide provided on one side portion of the display screen toward the other side portion, and to cause the light beams to enter an optical waveguide provided on the other side portion. These optical waveguides cause the light beams to travel in a lattice on the display screen of the display. When a portion of the display screen of the display is touched with a finger in this state, some of the light beams are disrupted or blocked. Therefore, the light-receiving optical waveguide senses alight blocked portion, whereby the position of the portion touched with the finger is detected.

The light beams emitted from an optical waveguide directly into the air diverge radially. In this state, optical transmission efficiency is low. To enhance the optical transmission efficiency, an optical transmission device has been proposed in which a lens is placed at the front of an optical waveguide which emits light beams to thereby prevent the light beams from diverging, and another lens is similarly placed at the front of an optical waveguide which receives the light beams to thereby cause the light beams in a converged state to enter the optical waveguide (see, for example, JP-A-2003-4960). This optical transmission device is schematically shown in FIGS. 8(a) and 8(b) in which the optical transmission device includes an optical waveguide 10 and a lens device 20. The lens device 20 includes a mounting surface 21 for placing the optical waveguide 10 thereon, and a lens 22 formed to protrude from one edge portion of the mounting surface 21. The optical waveguide 10 is bonded to the mounting surface 21 of the lens device 20 with an adhesive 50 and is positioned so that light beams pass through the lens 22. The refraction through the lens 22 is used to prevent the divergence of light beams (indicated by the arrow shown in FIG. 8(b)) emitted from the optical waveguide 10 and to converge light beams incident upon a light-receiving optical waveguide 10 in a manner described above.

In the above-mentioned optical transmission device, however, the light beams do not appropriately pass through the lens 22 so that the optical transmission efficiency is not sufficiently enhanced unless precise alignment is performed between the optical waveguide 10 and the lens 22. Additionally, the precise alignment requires accuracy and is hence difficult. It is labor- and time-consuming to achieve the precise alignment.

Further, it is necessary to bond the optical waveguide 10 and the lens device 20 to each other with the adhesive 50. During the bonding, the adhesive 50 sometimes squeezes out of a peripheral edge of the optical waveguide 10 to deface a peripheral portion of the optical waveguide 10, thereby causing a hindrance to optical transmission.

SUMMARY OF THE INVENTION

In view of the foregoing, it is an object of the present invention to provide an optical waveguide device for a touch panel which eliminates the need for alignment between an optical waveguide and a lens and for any adhesive and which appropriately emits and receives light beams, and to provide a touch panel using the same.

To accomplish the above-mentioned object, a first aspect of the present invention is intended for an optical waveguide device for a touch panel, which comprises: a body; a plurality of cores formed on a predetermined portion of a surface of the body, the plurality of cores including a light-emitting core and a light-receiving core; and an over-cladding layer formed on the surface of the body to cover the plurality of cores, the optical waveguide device being provided along a peripheral portion of a display screen of a display of the touch panel, the light-emitting core including an end surface positioned in a first side portion of the display screen of the display, the light-receiving core including an end surface positioned in a second side portion of the display screen of the display, the over-cladding layer including an end portion which covers each of the end surface of the light-emitting core and the end surface of the light-receiving core, the end portion of the over-cladding layer being formed as a lens portion, the lens portion including a surface formed as an arcuately curved surface in side view which bulges outwardly, wherein a distance (L) from the end surface of each of the light-emitting core and the light-receiving core to the center of curvature of the arcuately curved surface in side view and the radius (R) of curvature of the arcuately curved surface in side view satisfy the following condition (a):

$$(L/2)-0.3 < R < (L/2)+0.3 \quad (a)$$

[where L in mm, and R in mm.]

A second aspect of the present invention is intended for a touch panel comprising the optical waveguide device, the optical waveguide device being provided along a peripheral portion of a display screen of a display of the touch panel, wherein the light-emitting core includes an end surface positioned in a first side portion of the display screen of the display, and the light-receiving core includes an end surface positioned in a second side portion of the display screen of the display.

The present inventor has came up with the invention of forming the end portion per se of the over-cladding layer covering the end surface of each of the cores as the lens portion to solve the above-mentioned problem. Since the cores and the over-cladding layer are integrally formed without adhesive therebetween, the optical waveguide device for the touch panel according to the present invention achieves alignment and adhesion between the end surface of each of the cores and the lens portion formed in the end portion of the over-cladding layer without any adhesive when the over-cladding layer is formed. Further, the present inventor has made studies of the configuration of the lens portion and the like so as to achieve the appropriate emission and reception of light beams. As a result, the present inventor has ascertained the fact that, when the surface of the lens portion is formed as the arcuately curved surface in side view which bulges outwardly and the distance (L) from the end surface of each of the cores to the center of curvature of the arcuately curved surface in side view and the radius (R) of curvature of the arcuately curved surface in side view satisfy the above-mentioned condition (a), the vertical divergence as seen in side view of the light beams emitted from the end portion of each of the cores is suppressed by refraction through the lens portion. Further, the present inventor has found that, in the lens portion formed in the end portion of the over-cladding layer on the light-receiving side, the incident light beams are further narrowed down and converged vertically as seen in side view by refraction through the lens portion, and travel from the end surface of each of the cores toward the interior of each of the cores. Thus, the present inventor has attained the present invention.

In the optical waveguide device for the touch panel according to the present invention, the end portion of the over-cladding layer covering the end surface of the light-emitting core and the end surface of the light-receiving core is formed as the lens portion. This allows the optical waveguide device for the touch panel according to the present invention to achieve the automatic alignment and adhesion between the end surface of each of the cores and the lens portion formed in the end portion of the over-cladding layer without any adhesive when the over-cladding layer is formed. This eliminates the need for the process of aligning the end surface of each of the cores and the lens portion formed in the end portion of the over-cladding layer with each other and for any adhesive. Additionally, the above-mentioned specific configuration and specific dimensions of the lens portion allow the vertical divergence as seen in side view of the light beams emitted from the end surface of each of the cores to be appropriately suppressed by refraction through the lens portion formed in the end portion of the over-cladding layer, and the light beams incident on the end surface of each of the cores to be further narrowed down and converged vertically as seen in side view because of the configuration of the lens portion formed in the end portion of the over-cladding layer. As a result, the optical waveguide device allows optical transmission between the light-emitting core and the light-receiving core with appropriate optical transmission efficiency.

Since the touch panel according to the present invention includes the foregoing optical waveguide device for the touch panel in which the light beams emitted from the end portion of each core appropriately divergence, when the display screen of the display is touched with a finger, the position of a portion touched with the finger is precisely detected.

DESCRIPTION OF THE PREFERRED EMBODIMENTS

Preferred embodiments according to the present invention will now be described in detail with reference to the drawings.

Figure 1A:
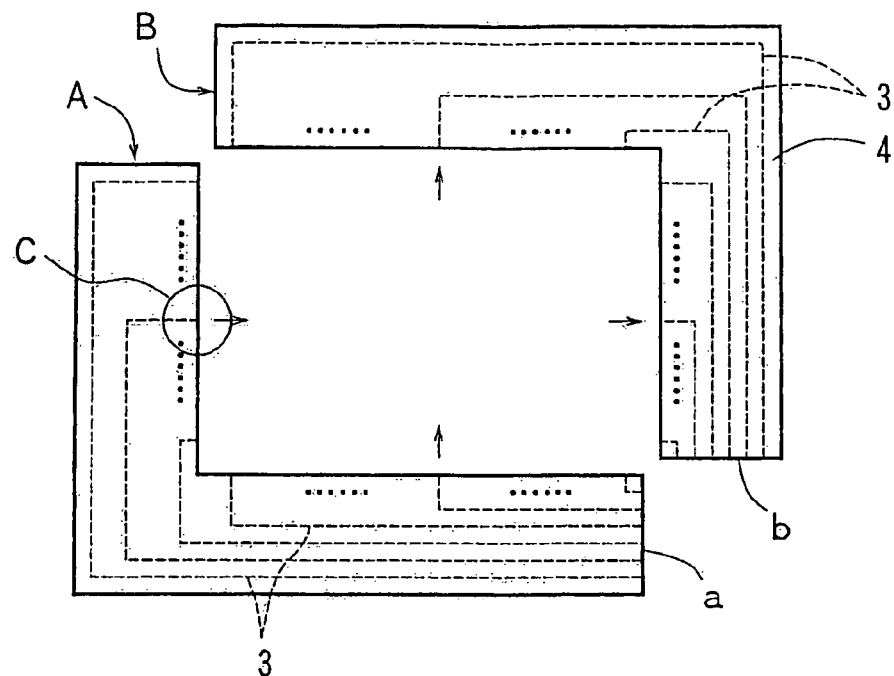
FIGS. 1(a) to 1(c) are a plan view, an enlarged view of an end portion of a core enclosed with a circle C of FIG. 1(a), a sectional view taken along the line X-X of FIG. 1(b), respectively, which schematically show an optical waveguide device for a touch panel according to a first embodiment of the present invention.
Figure 1B:
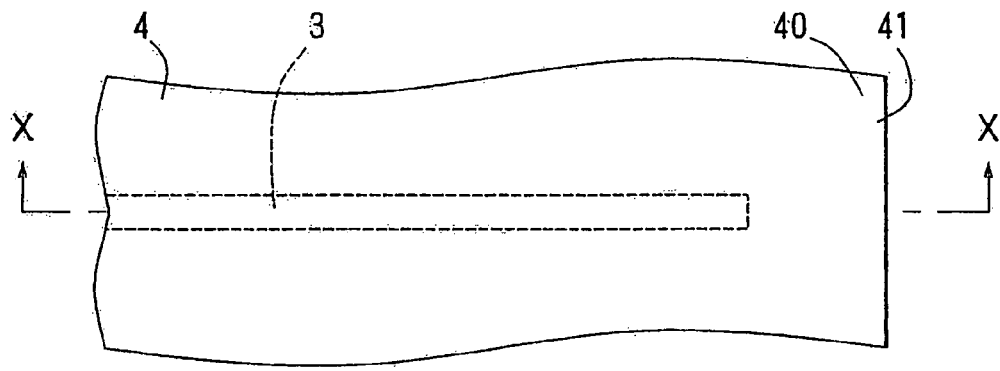
Figure 1C:
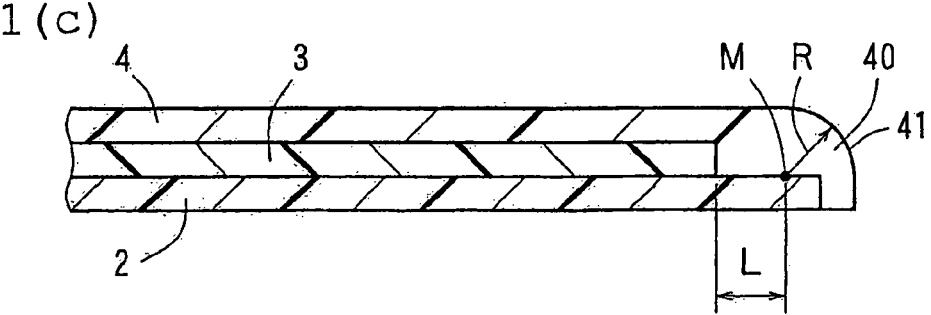

FIGS. 1(a) to 1(c) illustrate an optical waveguide device for a touch panel according to a first preferred embodiment of the present invention. The optical waveguide device for the touch panel according to the first preferred embodiment includes two L-shaped optical waveguides A and B. Of the two, one L-shaped optical waveguide A is a light-emitting optical waveguide (see arrows of FIG. 1(a)), and the other L-shaped optical waveguide B is a light-receiving optical waveguide (see arrows of FIG. 1(a)). Each of the two L-shaped optical waveguides A and B includes an under-cladding layer (body) 2 formed in an L-shaped configuration, and a plurality of cores 3 serving as a passageway for light and formed on predetermined portions of the surface of the under-cladding layer 2, the plurality of cores 3 being patterned to extend from a first end edge a or b of the L-shaped configuration of the optical waveguide A or B to inner end edge portions of the L-shaped configuration [on the display screen side of a display 11 (see FIG. 2)] and to be arranged in a parallel, equally spaced relationship. Each of the two L-shaped optical waveguides A and B further includes an over-cladding layer 4 formed on the surface of the under-cladding layer 2 so as to cover the cores 3. The number of cores 3 formed in the light-emitting L-shaped optical waveguide A is equal to the number of cores 3 formed in the light-receiving L-shaped optical waveguide B. An end portion of the over-cladding layer 4 which covers an end surface of each of the cores 3 which is located in the inner end edge portion of the L-shaped configuration is formed as a lens portion 40 having an outwardly bulging surface 41 formed as a substantially quadrantal curved surface in side view (hereinafter, referred as "substantially quadrantal curved surface 41"), as shown in FIG. 1(c) which is a sectional view taken along the line X-X in FIG. 1(b) that is an enlarged view of a circular portion C of FIG. 1(a). This lens portion 40 is formed in a strip-shaped configuration extending along the inner edge portion of the L-shaped configuration as seen in plan view, as shown in FIG. 1(b). The lens portion 40 will be described later in detail. In FIG. 1(a), the cores 3 are indicated by broken lines, and the thickness of the broken lines indicates the thickness of the cores 3. Also, the number of cores 3 are shown as abbreviated by using dots.

Figure 2:
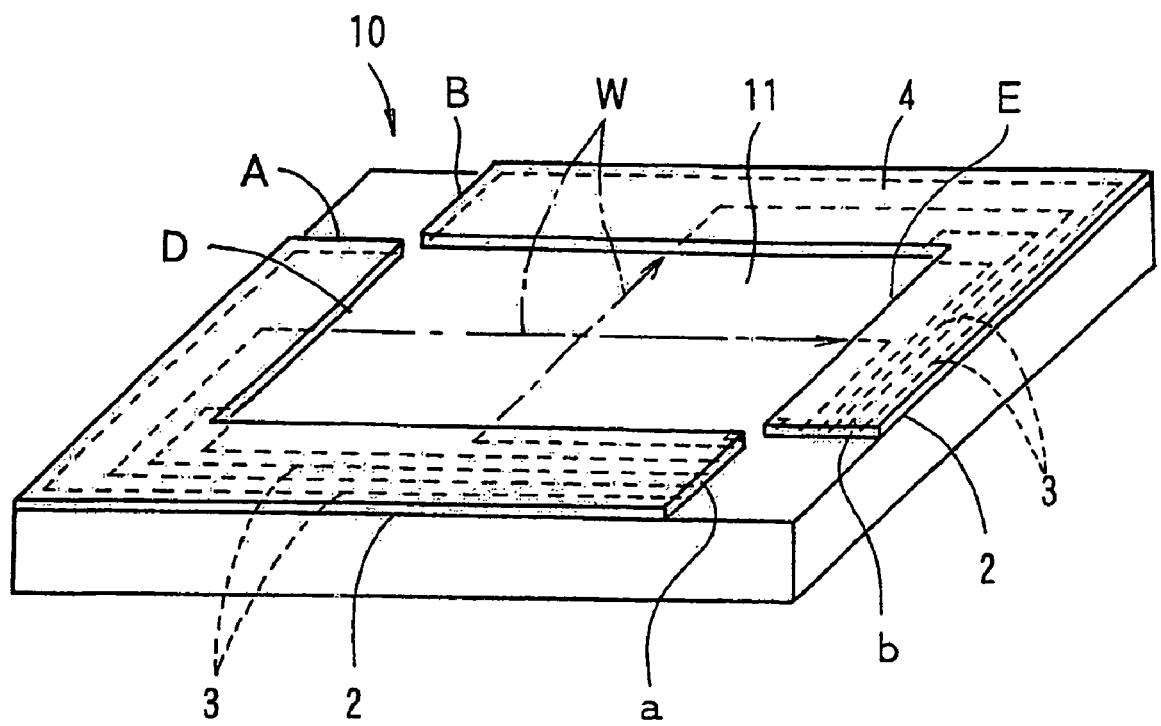
FIG. 2 is a perspective view schematically showing a touch panel using the optical waveguide device for the touch panel.

As illustrated in FIG. 2, the two L-shaped optical waveguides A and B are provided along the rectangular shape of the periphery of the display screen of the rectangular display 11 of a touch panel 10 so as to surround the display screen. A light source (not shown) is connected to the cores 3 on the first end edge a of the L-shaped optical waveguide A which emits light beams W, and a detector (not shown) is connected to the cores 3 on the first end edge b of the L-shaped optical waveguide B which receives the light beams W. More specifically, in conditions as shown in FIG. 2, the end surfaces of the cores 3 which emit the light beams W are aligned along an L-shape D (a first side) of the periphery of the display screen of the display 11, and the end surfaces of the cores 3 which receive the light beams W are aligned along another L-shape E (a second side) of the periphery of the display screen of the display 11, the L-shape E being opposed to the L-shape D. The end surfaces of the respective cores 3 which emit the light beams W are positioned in face-to-face relationship with the end surfaces of the respective cores 3 which receive the light beams W. This condition is shown in perspective view in FIG. 2. In FIG. 2, as in FIG. 1(a), the cores 3 are indicated by broken lines, and the thickness of the broken lines indicates the thickness of the cores 3. Also, the number of cores 3 are shown as abbreviated. Only some of a multiplicity of light beams W are shown in FIG. 2 for ease of understanding.

The lens portion 40 formed in the end portion of the over-cladding layer 4 will be described in further detail. The surface of the lens portion 40 is formed as the outwardly budging substantially quadrantal curved surface 41 in side view, as shown in FIG. 1(c). The dimensions of the lens portion 40 formed in the end portion of the over-cladding layer 4 are set so that a distance (L) from the end surface of each of the cores 3 to the center M of curvature of the substantially quadrantal curved surface 41 in side view and the radius (R) of curvature of the substantially quadrantal curved surface 41 in side view satisfy the following condition (a). The following condition (a) is an expression obtained by the present inventor after repeated experiments.

$$(L/2)-0.3<R<(L/2)+0.3 \quad \text{(a)}$$

[where L in mm, and R in mm]

Figure 3A:
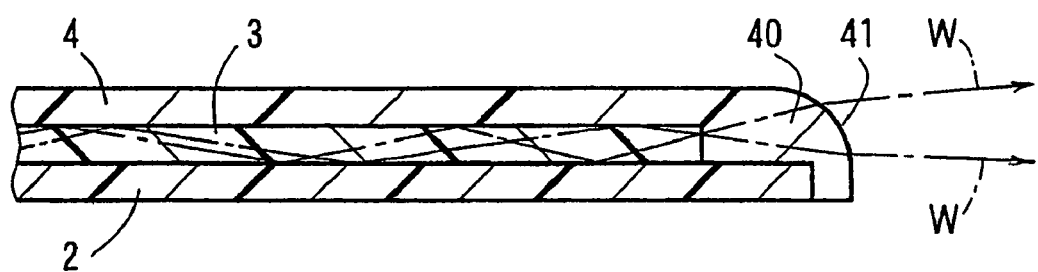
FIGS. 3(a) and 3(b) are an enlarged sectional view schematically showing the transmission of light beams in the optical waveguide device for the touch panel when the light beams are emitted, and an enlarged sectional view schematically showing the transmission of light beams in the optical waveguide device for the touch panel when the light beams are received, respectively.

In the L-shaped optical waveguide A which emits the light beams W, as shown in FIG. 3(a), the light beams W emitted from the end surface of each of the cores 3 travel in the over-cladding layer 4 at the front of the end surface of each of the cores 3, and the light beams W emitted from the substantially quadrantal curved surface 41 in side view that is the surface of the lens portion 40 are restrained from diverging vertically as seen in side view (in a vertical direction, that is, in a direction perpendicular to the longitudinal direction of the under-cladding layer 2 as seen in FIG. 3(a)) to become close to parallel light beams as seen in side view under the influence of the configuration thereof. That is, the light beams W having passed through the lens portion 40 travel along the display screen of the display 11 (see FIG. 2) while neither spreading too wide nor narrowing down by reflection through the lens portion 40. This provides the appropriate area of a light-receiving region of the L-shaped optical waveguide B which receives the light beams W.

Figure 3B:
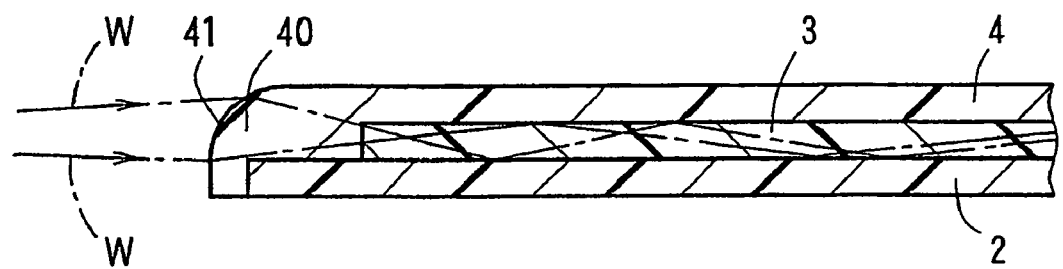

In the L-shaped optical waveguide B which receives the light beams W, as illustrated in FIG. 3(b), the light beams W having traveled over the display screen of the display 11 (see FIG. 2) are received by the substantially quadrantal curved surface 41 in side view that is the surface of the lens portion 40 formed in the end portion of the over-cladding layer 4, and are further narrowed down and converged vertically as seen in side view under the influence of the configuration thereof. Then, while being converged, the light beams W enter each of the cores 3 through the end surface of each of the cores 3, and travel toward the interior of each of the cores 3.

Since such optical transmission is done between the two L-shaped optical waveguides A and B shown in FIG. 2, the two L-shaped optical waveguides A and B described above cause the light beams W to travel in a lattice on the display screen of the display 11 of the touch panel 10 as shown in the figure while the vertical divergence of the light beams W as seen in side view is suppressed (although only some of the light beams W forming the lattice are shown in FIG. 2 for ease of understanding). Thus, when the display screen of the display 11 is touched with a finger in this state, the position of a portion touched with the finger is precisely detected.

The dimensions and the like of the L-shaped optical waveguides A and B may be determined to conform to the size of the display 11 of the touch panel 10. For example, the lengths of two elongated portions of the L-shaped optical waveguides A and B are on the order of 30 to 300 mm, and the widths of the two elongated portions thereof are on the order of 50 μm to 2 mm. The number of light-emitting (light-receiving) cores 3 may be determined according to the number of operation details to be displayed on the display screen of the display 11, and is, for example, on the order of 20 to 100.

Next, an exemplary manufacturing method of such an optical waveguide device for a touch panel according to the present invention will be described. FIGS. 4(a) to 4(d) to which reference is made in this description show the manufacturing method mainly about the lens portion 40 shown in FIGS. 1(b) and 1(c) and a peripheral portion thereof.

Figure 4A:
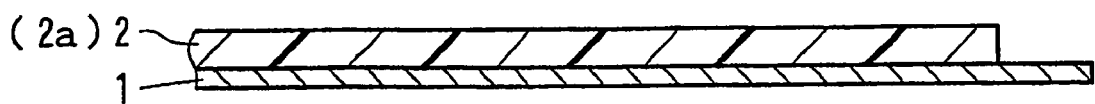
FIGS. 4(a) to 4(d) are views schematically illustrating a manufacturing method of the optical waveguide device for the touch panel.

First, a base 1 of a flat shape [see FIG. 4(a)] for use in the manufacture of the optical waveguides A and B for the touch panel (see FIGS. 1(a) to 1(c)) is prepared. Examples of a material for the formation of the base 1 include glass, quartz, silicone, resins, metals and the like. The thickness of the base is, for example, in the range of 20 μm (for a film-like base 1) to 5 mm (for a plate-like base 1).

Next, as shown in FIG. 4(a), a varnish prepared by dissolving a photosensitive resin in a solvent, which serves as a material for the formation of the under-cladding layer 2, is applied to a predetermined region on the above-mentioned base 1. The application of the varnish is achieved, for example, by a spin coating method, a dipping method, a casting method, an injection method, or an ink jet method. Then, the varnish is dried by a heat treatment at 50° C. to 120° C. for 10 to 30 minutes. This provides a photosensitive resin layer 2a which is to be formed into the under-cladding layer 2.

Next, the photosensitive resin layer 2a is exposed to radiation. Examples of the radiation for the exposure used herein include visible light, ultraviolet radiation, infrared radiation, X-rays, alpha rays, beta rays, gamma rays and the like. Preferably, ultraviolet radiation is used. This is because the use of ultraviolet radiation achieves irradiation with large energy to provide a high rate of curing, and a small-sized and inexpensive irradiation apparatus can be employed, thereby reducing production costs. A light source of the ultraviolet radiation may be, for example, a low-pressure mercury-vapor lamp, a high-pressure mercury-vapor lamp, or an ultra-high-pressure mercury-vapor lamp. The dose of the ultraviolet radiation is typically 10 mJ/cm² to 10000 mJ/cm², preferably 50 mJ/cm² to 3000 mJ/cm².

After the exposure, a heat treatment is performed to complete a photoreaction. This heat treatment is performed at 80° C. to 250° C., preferably at 100° C. to 200° C., for 10 seconds to two hours, preferably for five minutes to one hour. This forms the photosensitive resin layer 2a into the under-cladding layer 2. The thickness of the under-cladding layer 2 (the photosensitive resin layer 2a) is typically in the range of 1 µm to 50 µm, preferably in the range of 5 µm to 30 µm.

Figure 4B:
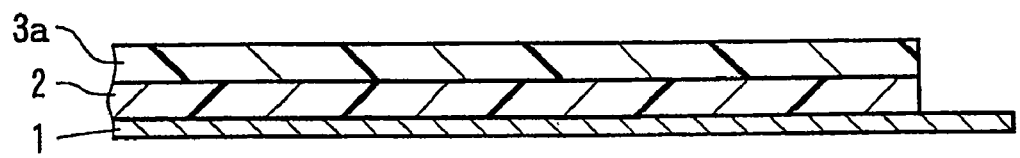

Next, as shown in FIG. 4(b), a photosensitive resin layer 3a which is to be formed into the cores 3 is formed on the surface of the under-cladding layer 2. The formation of this photosensitive resin layer 3a is carried out in a manner similar to the method for the formation of the photosensitive resin layer 2a formed into the under-cladding layer 2 described with reference to FIG. 4(a). A material for the formation of the cores 3 used herein is a material having a refractive index greater than that of the materials for the formation of the under-cladding layer 2 and the over-cladding layer 4 [see FIG. 1(c)] described later. The refractive index may be adjusted, for example, by selection of the types of the materials for the under-cladding layer 2, the cores 3 and the over-cladding layer 4 and adjustment of the composition ratio thereof.

Next, an exposure mask formed with an opening pattern corresponding to the pattern of the cores 3 is placed over the photosensitive resin layer 3a. Then, the photosensitive resin layer 3a is exposed to radiation through the exposure mask. Thereafter, a heat treatment is performed. The exposure and the heat treatment are carried out in a manner similar to the method for the formation of the under-cladding layer 2 described with reference to FIG. 4(a).

Figure 4C:
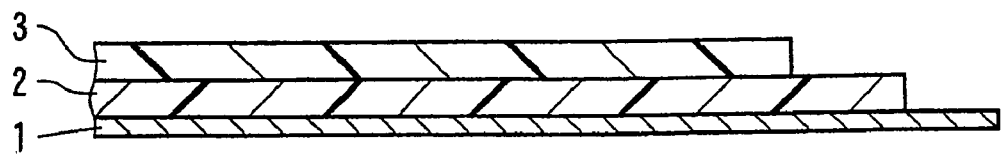

Subsequently, development is performed using a developing solution to dissolve away an unexposed portion of the photosensitive resin layer 3a [see FIG. 4(b)], thereby forming the photosensitive resin layer 3a remaining on the under-cladding layer 2 into the pattern of the cores 3, as shown in FIG. 4(c). Exemplary methods to be employed for the development include an immersion method, a spray method and a puddle method. Examples of the developing solution used herein include an organic solvent and an organic solvent containing an alkaline aqueous solution. The developing solution and conditions for the development are selected as appropriate depending on the composition of a photosensitive resin composition.

After the development, the developing solution in the remaining photosensitive resin layer 3a formed in the pattern of the cores 3 is removed by a heat treatment. This heat treatment is typically performed at 80° C. to 120° C. for 10 to 30 minutes. Thus, the remaining photosensitive resin layer 3a formed in the pattern of the cores 3 is formed into the cores 3. The thickness of the cores 3 (the photosensitive resin layer 3a) is typically in the range of 20 µm to 150 µm, preferably in the range of 40 µm to 100 µm. The width of the cores 3 is typically in the range of 8 µm to 50 µm, preferably in the range of 10 µm to 25 µm.

Figure 4D:
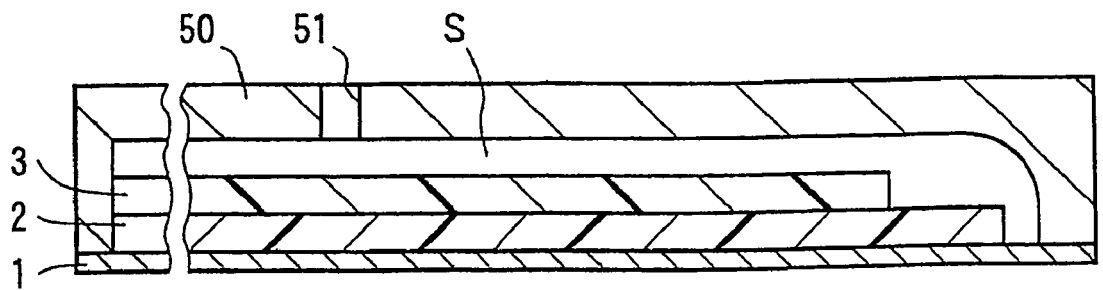

Then, as shown in FIG. 4(d), a molding die 50 is used which is made of a material permeable to radiation such as ultraviolet radiation and the like, for example, quartz, and which is formed with a recessed portion having a die surface complementary in shape to the surface (including the lens portion 40) of the over-cladding layer 4 [see FIG. 1(c)]. An opening surface of the recessed portion is positioned in a predetermined position of the surface of the base 1, and the molding die 50 is brought into intimate contact with the surface of the base 1. At this time, a mold space S is defined which is surrounded by the die surface of the recessed portion and the surfaces of the base 1, the under-cladding layer 2 and the cores 3. Next, a photosensitive resin for the formation of the over-cladding layer 4 is charged through an inlet 51 formed in the molding die 50 into the mold space S. Exposure to radiation such as ultraviolet radiation and the like is performed through the molding die 50. After the molding die 50 is removed, a heat treatment or the like is performed to form the over-cladding layer 4 [see FIG. 1(c)]. At this time, the one end portion of the over-cladding layer 4 is in the form of the lens portion 40. The exposure and the heat treatment described above are carried out in a manner similar to the method for the formation of the under-cladding layer 2 described with reference to FIG. 4(a). The thickness of the over-cladding layer 4 (a thickness as measured from the surface of the cores 3) is typically in the range of 20 µm to 10000 µm, preferably in the range of 300 µm to 2000 µm.

The over-cladding layer 4 (including the lens portion 40) is formed in this manner. Thus, the cores 3 and the over-cladding layer 4 are integrated with each other without any adhesive therebetween, with the end surface of each of the cores 3 and the lens portion 40 at the front thereof positioned relative to each other, when the over-cladding layer 4 is formed. Where the under-cladding layer 2 and the over-cladding layer 4 are made of the same material, the under-cladding layer 2 and the over-cladding layer 4 are merged with each other at the contact portions thereof.

Subsequently, the base 1 is removed from the under-cladding layer 2. An example of the method for the removal is as follows. A lower surface of the base 1 is brought into contact with an upper surface of a vacuum suction stage (not shown), and the base 1 is fixed thereon by air suction. Next, a vacuum suction machine (not shown) adheres to an upper surface of the over-cladding layer 4 under suction to lift an adhering portion thereof in this state. This removes the under-cladding layer 2 of the optical waveguide device for the touch panel from the base 1, with the cores 3 and the under-cladding layer 2 as well as the over-cladding layer 4 bonded together. The adhesive force between the base 1 and the under-cladding layer 2 is smaller than the adhesive forces between the over-cladding layer 4 and the cores 3 and between over-cladding layer 4 and the under-cladding layer 2 because of the materials thereof. Thus, the above-mentioned process easily removes the base 1 from the under-cladding layer 2.

Then, portions which become the two L-shaped optical waveguides A and B described above are cut by punching using a blade and the like. This provides an optical waveguide device for a touch panel including the two L-shaped optical waveguides A and B shown in FIGS. 1(a) and 1(b).

Figure 5:
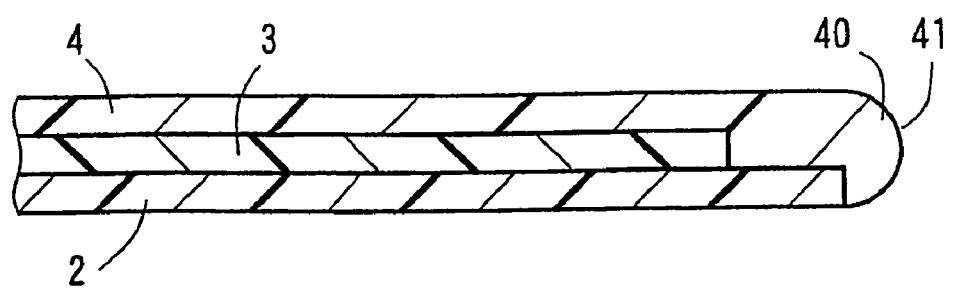
FIG. 5 is an enlarged sectional view schematically showing the end portion of the core of the optical waveguide device for the touch panel according to a second embodiment of the present invention.

FIG. 5 shows the optical waveguide device for the touch panel according to a second preferred embodiment of the present invention. The optical waveguide device for the touch panel according to the second embodiment is similar to the first embodiment except that the outwardly bulging end surface 41 of the lens portion 40 in the second embodiment is formed as a substantially semicircular curved surface in side view. Except for this, the second embodiment is similar to the first embodiment described above. Like reference numerals and characters are used in the second embodiment to designate parts similar to those of the first embodiment.

Figure 6:
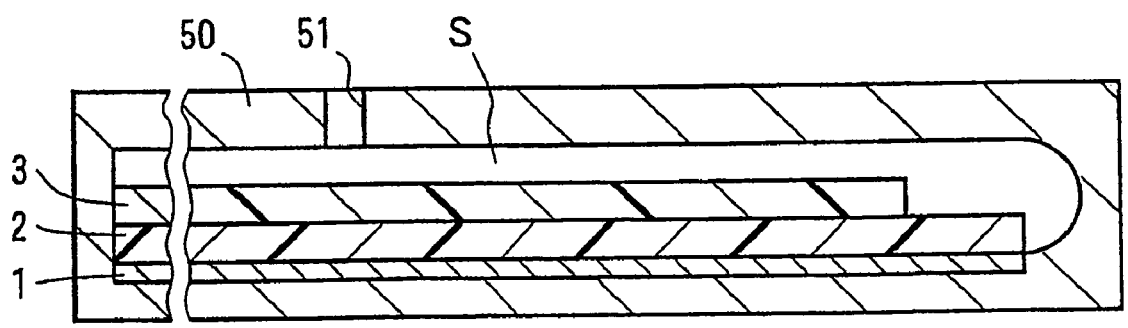
FIG. 6 is a view schematically illustrating the step of forming an over-cladding layer in the manufacturing method of the optical waveguide device for the touch panel of the second embodiment.

A manufacturing method of such an optical waveguide device for a touch panel is performed by changing the molding die 50 used for the formation of the over-cladding layer 4 in the first embodiment to that having a die surface adapted to the formation of the lens portion 40, as shown in FIG. 6. In this embodiment, a layered structure including the base 1, the under-cladding layer 2 and the cores 3 is disposed in the molding die 50.

Figure 7A:
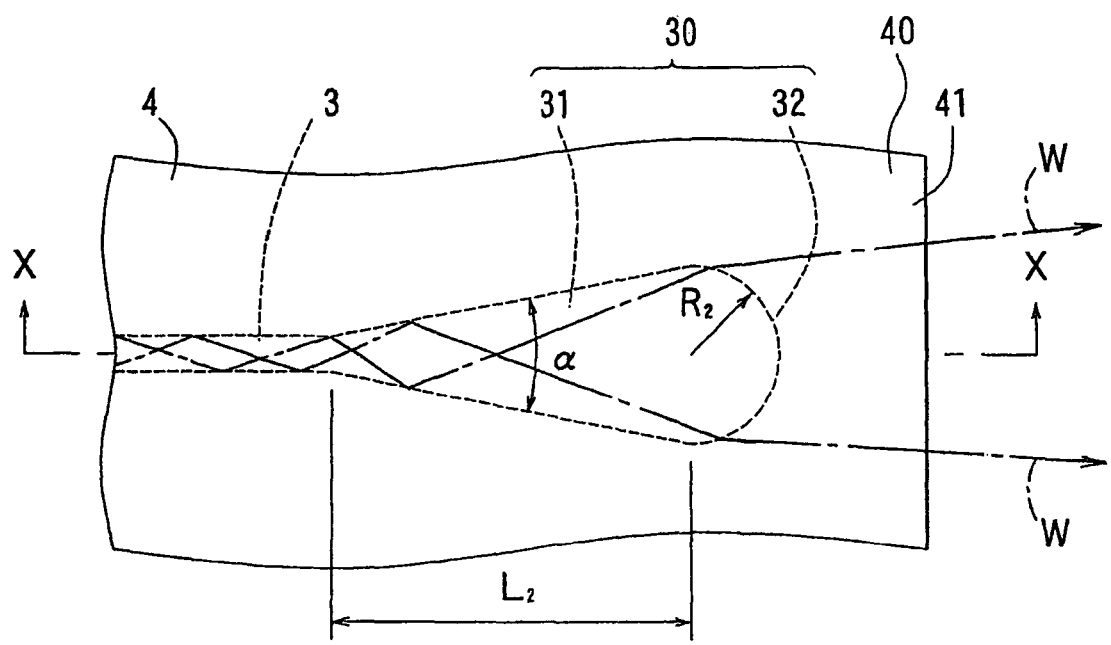
FIGS. 7(a) and 7(b) are a plan view and a sectional view taken along the line X-X of FIG. 7(a), respectively, which schematically show the end portion of the core of the optical waveguide device for the touch panel according to a third embodiment of the present invention.
Figure 7B:
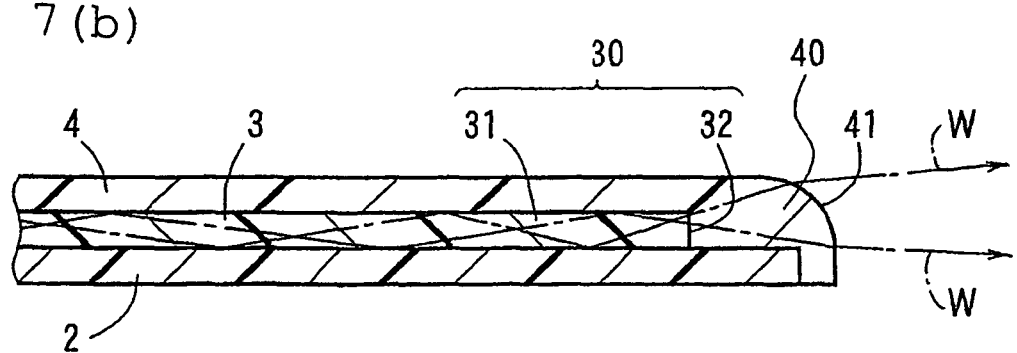
Figure 8A:
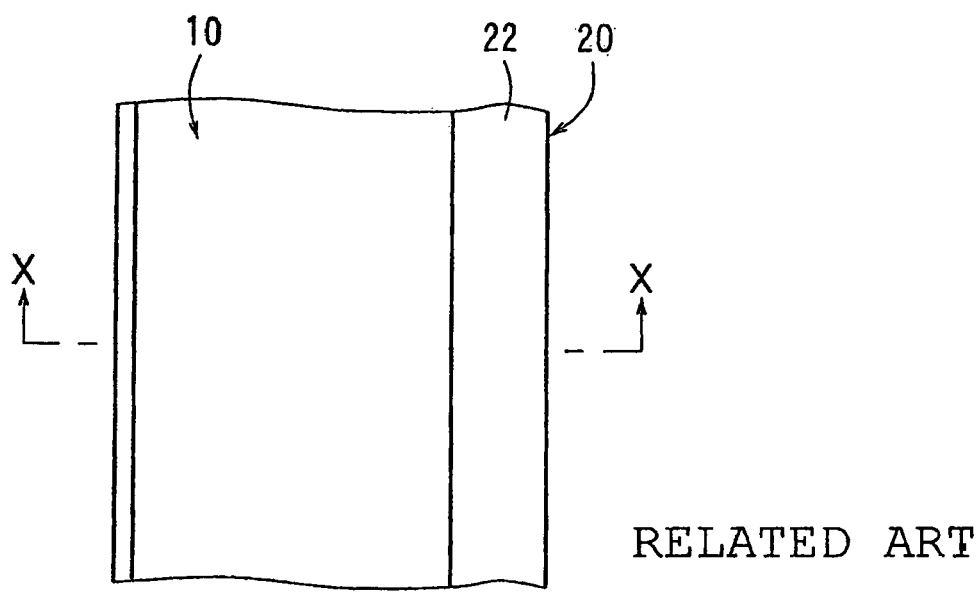
FIGS. 8(a) and 8(b) are a plan view and a sectional view taken along the line X-X of FIG. 8(a), respectively, which schematically show a related art optical transmission device.
Figure 8B:
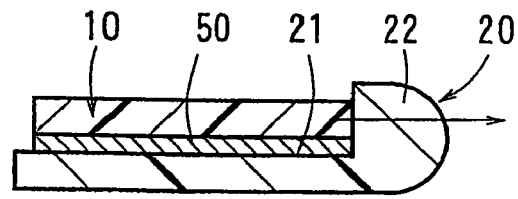

FIGS. 7(a) and 7(b) show the optical waveguide device for the touch panel according to a third embodiment of the present invention. The optical waveguide device for the touch panel according to the third embodiment is similar to the first embodiment except that an end portion of each of the cores 3 which emit light beams and an end portion of each of the cores 3 which receive light beams are formed as a second lens portion 30 having the shape of a head portion of what is called a rice paddle, as shown in the plan view of FIG. 7(a). This second lens portion 30 is flat as seen in side view, as shown in FIG. 7(b). The formation of the second lens portion 30 is achieved by changing the opening pattern of the exposure mask used for the formation of the cores 3 to that corresponding to the pattern of the cores 3 including the second lens portion 30. Except for this, the third embodiment is similar to the first embodiment described above. Like reference numerals and characters are used in the third embodiment to designate parts similar to those of the first embodiment.

The second lens portion 30 formed in the end portion of each of the cores 3 and having the shape of a head portion of what is called a rice paddle will be described in further detail. The second lens portion 30 has a tapered portion 31 such that the width thereof gradually increases toward the end surface thereof, and the end surface of each of the cores 3 is formed as an arcuately curved surface 32 in plan view which bulges outwardly. The dimensions of the second lens portion 30 formed in the end portion of each of the cores 3 are as follows: (1) Where the tapered portion 31 has a length ($L_2$) of not less than 700 μm, a taper angle ($\alpha$) is in the range of 2 to 16 degrees, and the length ($L_2$) of the tapered portion 31, the taper angle ($\alpha$) and the radius ($R_2$) of curvature of the arcuately curved surface 32 in plan view satisfy the following condition (b). The following condition (b) is an expression obtained by the present inventor after repeated experiments. In this case [where the length ($L_2$) of the tapered portion 31 is not less than 700 μm], there is no upper limit to the length ($L_2$) of the tapered portion 31. However, the excessively great length ($L_2$) of the tapered portion 31 merely requires much space in the peripheral portion of the display screen of the display 11 (see FIG. 2) of the touch panel 10, and does not make sense in terms of optical transmission. (2) Where the tapered portion 31 has a length ($L_2$) of less than 700 μm, the length ($L_2$) of the tapered portion 31 is set at not less than 400 μm (set so as not to fall below 400 μm), the taper angle ($\alpha$) is in the range of 6 to 14 degrees, and the following condition (b) is satisfied.

$$0.5 \times L_2 \times \tan(\alpha/2) < R_2 < 2.5 \times L_2 \times \tan(\alpha/2) \quad (b)$$

[where $L_2$ in μm, $\alpha$ in degrees, and $R_2$ in μm]

The horizontal divergence (the divergence along the under-cladding layer 2) of the light beams w emitted from each of the cores 3 is suppressed by refraction through the second lens portion 30 formed in the end portion of each of the cores 3. Specifically, the light beams W travel in each of the cores 3 while being reflected frequently repeatedly, and are reflected in the tapered portion 31 of the second lens portion 30 having the shape of a head portion of a rice paddle so as to be easily directed toward the arcuately curved surface 32 in plan view at the extreme tip [i.e., the angles of reflection are adjusted by adjusting the taper angle ($\alpha$) of the tapered portion 31]. The number of times of reflection decreases as the light beams W travel along an increasing-width tip portion of the second lens portion 30, and the light beams W emitted from the arcuately curved surface 32 in plan view at the extreme tip are close to parallel light beams as seen in plan view because of the configuration of the arcuately curved surface 32 in plan view. Subsequently, the light beams W travel to the lens portion 40 formed in the end portion of the over-cladding layer 4 which covers the front of the second lens portion 30, and the vertical divergence (the divergence in a direction perpendicular to the longitudinal direction of the under-cladding layer 2 as seen in FIG. 7(b)) of the light beams W as seen in side view is suppressed by refraction through the lens portion 40. When the light beams W are received, the light beams W are narrowed down and converged vertically by refraction through the lens portion 40 formed in the end portion of the over-cladding layer 4, and enter each of the cores 3 through the end surface (arcuately curved surface 32 in plan view) of each of the cores 3 in that state. At this time, the light beams W are narrowed down and converged horizontally. Specifically, the light beams w entering through the end surface of each of the cores 3 are received by the arcuately curved surface 32 in plan view which is formed wide, are reflected gently inwardly because of the configuration of the arcuately curved surface 32 in plan view, and travel from an increasing-width tip portion toward the interior of each of the cores 3 having a narrow optical passage. At this time, the light beams W are converged as the light beams W travel, and the converged light beams W travel in each of the cores 3. This increases optical transmission efficiency to improve the precision of the finger detection in the touch panel 10 (see FIG. 2).

In the above-mentioned preferred embodiments, the formation of the under-cladding layer 2 and the over-cladding layer 4 uses the photosensitive resin as the materials thereof, and is achieved by exposure and development However, other materials and other methods may be used. As an example, the formation of the under-cladding layer 2 and the over-cladding layer 4 may use a thermosetting resin such as polyimide resin and epoxy resin as the materials of the under-cladding layer 2 and the over-cladding layer 4, and may be achieved by applying a varnish prepared by dissolving the thermosetting resin in a solvent and then performing a heat treatment (typically at 300° C. to 400° C. for 60 to 180 minutes) to harden the varnish and the like.

In the above-mentioned preferred embodiments, the photosensitive resin is used to form the under-cladding layer 2, but other materials may be used. A resin film may be used as the under-cladding layer 2. Alternatively, a substrate with a metal film or a metal thin film formed on the surface thereof may be used in place of the under-cladding layer 2 so that the surface of the metal material functions as a surface for reflecting the light beams W propagating inside the cores 3.

In the above-mentioned preferred embodiments, the optical waveguide device for the touch panel includes the two L-shaped optical waveguides A and B. However, the two L-shaped optical waveguides A and B may be integrated at their opposite ends together into a rectangular frame-shaped configuration. The manufacturing method thereof may include the step of cutting into the rectangular frame-shaped configuration in place of the step of cutting into two L-shaped configurations in the foregoing manufacturing method of the optical waveguide device for the touch panel.

Where a film-like base is used as the base 1 in the foregoing manufacturing method of the optical waveguide device for the touch panel, the film-like base 1 may be removed from the under-cladding layer 2 after the cutting into the L-shaped configurations together with the film-like base 1. Alternatively, the base 1 may be used together with the optical waveguide device for the touch panel without being removed.

Next, inventive examples of the present invention will be described in conjunction with comparative examples. It should be noted that the present invention is not limited to the inventive examples.

EXAMPLES

Examples 1 to 3 and Comparative Examples 1 to 3

Material for Formation of Under-cladding Layer and Over-cladding Layer

A material for formation of an under-cladding layer and an over-bladding layer was prepared by mixing 35 parts by weight of bisphenoxyethanol fluorene glycidyl ether (component A) represented by the following general formula (1), 40 parts by weight of 3',4'-Epoxycyclohexylmethyl-3,4-Epoxycyclohexane carboxylate which is an alicyclic epoxy (CELLOXIDE 2021P manufactured by Daicel Chemical Industries, Ltd.) (component B), 25 parts by weight of an alicyclic epoxy resin having a cyclohexene oxide skeleton (CELLOXIDE 2081 manufactured by Daicel Chemical Industries. Ltd.) (component C), and 2 parts by weight of a 0.50% propione carbonate solution of 4,4'-bis[di(β-hydroxyethoxy) phenylsulfinio]phenylsulfide bishexafluoroantimonate (component D).

core material. Then, exposure to ultraviolet radiation at 4000 mJ/cm$^2$ was performed by a contact exposure method from above the mask. Thereafter, a heat treatment was performed at 120° C. for 15 minutes. Next, development was carried out using an aqueous solution of γ-butyrolactone to dissolve away an unexposed portion. Thereafter, a heat treatment was performed at 120° C. for 30 minutes to form the cores. An end portion of each of the cores 3 which emit light beams and an end portion of each of the cores 3 which receive light beams were formed as a tapered portion (having a taper angle of 7 degrees and a length of 2300 μm) such that the width thereof gradually increases toward the end surface thereof, and the end surface was formed as an arcuately curved surface in plan view (having a radius of curvature of 160 μm) which bulges outwardly (or formed as a second lens portion), so that the horizontal divergence (the divergence as seen in plan view) of the emitted light beams was suppressed. The dimensions of a core portion other than these end portions in cross section were 15 μm in width×30 μm in height. The dimensions were measured with an SEM (electron microscope). The refractive index of the cores at a wavelength of 830 nm was 1.588.

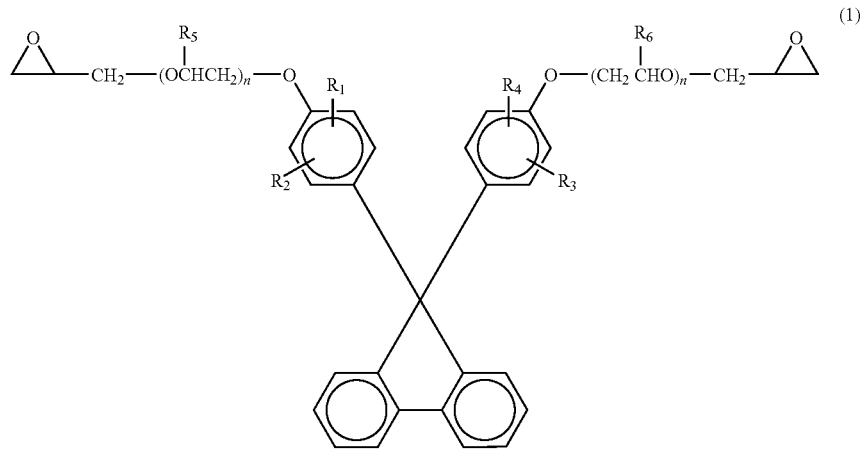

(1)

wherein $R_1$ to $R_6$ are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in 28 parts by weight of ethyl lactate.

Production of Optical Waveguide Device for Touch Panel

The material for the formation of the under-cladding layer was applied to the surface of a polyethylene naphthalate (PEN) film [160 mm×160 mm×188 μm (thick)] by a spin coating method. Thereafter, exposure by the use of irradiation with ultraviolet light at 2000 mJ/cm$^2$ was performed. Subsequently, a heat treatment was performed at 100° C. for 15 minutes to form the under-cladding layer. The thickness of this under-cladding layer was 25 μm when measured with a contact-type film thickness meter. The refractive index of this under-cladding layer at a wavelength of 830 nm was 1.502.

Next, the material for the formation of the cores was applied to the surface of the under-cladding layer by a spin coating method. Thereafter, a drying process was performed at 100° C. for 15 minutes. Next, a synthetic quartz chrome mask (exposure mask) formed with an opening pattern identical in shape with a core pattern was placed over the resulting Next, a molding die made of quartz for the formation of the over-cladding layer was prepared so as to conform to the dimensions of a lens portion shown in Table 1 below (Examples 1 to 3 and Comparative Examples 1 to 3). Each of these molding dies was formed with a recessed portion having a die surface complementary in shape to the surface (including the lens portion) of the over-cladding layer. A die surface of an end portion corresponding to the lens portion was a substantially quadrantal curved surface in side view having a radius of curvature (equal to the radius R of curvature of the lens portion to be formed) set at values listed in Table 1 below. Then, an opening surface of the recessed portion was positioned on and brought into intimate contact with the surface of a base so that a distance (L) between the center of curvature of the substantially quadrantal curved surface in side view and the tip of each core took values listed in Table 1 below. In this state, the material for the formation of the over-cladding layer was charged through an inlet formed in the molding die into a mold space. Then, exposure to ultraviolet radiation at 2000 mJ/cm$^2$ was performed through the molding die. After the molding die was removed, a heat treatment was performed at 150° C. for 60 minutes to thereby form the over-cladding layer. The thickness (the thickness as measured from the surface of the cores) of the over-cladding layer in cross section was 1325 μm when measured under a microscope. The refractive index of the over-cladding layer at a wavelength of 830 nm was 1.502.

Then, after the removal from the PEN film, a light receiving portion and a light emitting portion were cut by dicing. This provided an optical waveguide device for a touch panel (having outside dimensions of 80 mm×60 mm and a frame width of 10 mm).

Measurement of Optical Transmission Loss

The obtained optical waveguide device for the touch panel was placed on a surface of a rectangular glass panel. Optical transmission loss of pairs each of one of the light-emitting cores and one of the light-receiving cores opposed thereto were measured in a manner to be described below. Specifically, a VCSEL (of 5 mA and having a wavelength of 850 nm) was connected to one end surface of the one light-emitting core (an end surface thereof opposite from the second lens portion) by using a manual axis-adjustment stage, and a multimode fiber having a core diameter of 50 μm was connected to one end surface of the one light-receiving core (an end surface thereof opposite from the second lens portion). A power meter was connected to the multimode fiber. The power meter measured the light beams emitted from the VCSEL through the multimode fiber to detect the optical transmission loss. As a result, an optical transmission loss of less than 20 dB was evaluated as being a "low optical transmission loss" and indicated by an open circle (○), and an optical transmission loss of not less than 20 dB was evaluated as being a "high optical transmission loss" and indicated by a cross (X). The results of the evaluation were also shown in Table 1 below.

TABLE 1

|  |  | Examples | | | Comparative Examples | | |
|---|---|---|---|---|---|---|---|
|  |  | 1 | 2 | 3 | 1 | 2 | 3 |
| From Core Tip to Center of Curvature: L (mm) |  | 0.7 | 6.0 | 20.0 | 0.5 | 6.0 | 10.0 |
| Radius of Curvature: R(μm) |  | 0.3 | 3.0 | 10.0 | 0.25 | 2.0 | 6.0 |
| (L/2) − 0.3 |  | 0.05 | 2.7 | 9.7 | −0.05 | 2.7 | 4.7 |
| (L/2) + 0.3 |  | 0.35 | 3.3 | 10.3 | 0.55 | 3.3 | 5.3 |
| Optical Transmission Loss | Value (dB) | 19.2 | 13.6 | 17.3 | 30.1 | 28.1 | 27.2 |
|  | Evaluation | ○ | ○ | ○ | X | X | X |

The foregoing results show that the optical waveguide devices for the touch panel according to Examples 1 to 3 wherein the dimensions of the lens portion formed in the end portion of the over-cladding layer are within a specific range are low in optical transmission loss, and the optical waveguide devices for the touch panel according to Comparative Examples 1 to 3 wherein the dimensions of the lens portion formed in the end portion of the over-cladding layer are outside the range are high in optical transmission loss.

What is claimed is:

1. An optical waveguide device for a touch panel, comprising:
   a body;
   a plurality of cores formed on a predetermined portion of a surface of said body, the plurality of cores including a light-emitting core and a light-receiving core; and
   an over-cladding layer formed on the surface of said body to cover said plurality of cores,
   said optical waveguide device being provided along a peripheral portion of a display screen of a display of the touch panel,
   said light-emitting core including an end surface positioned in a first side portion of the display screen of said display,
   said light-receiving core including an end surface positioned in a second side portion of the display screen of said display,
   said over-cladding layer including an end portion which covers each of the end surface of the light-emitting core and the end surface of the light-receiving core,
   said end portion of the over-cladding layer being formed as a lens portion,
   said lens portion including a surface formed as an arcuately curved surface in side view which bulges outwardly,
   wherein a distance (L) from the end surface of each of said light-emitting core and said light-receiving core to the center of curvature of the arcuately curved surface in side view and the radius (R) of curvature of the arcuately curved surface in side view satisfy the following condition (a):

$(L/2)-0.3 < R < (L/2)+0.3$      (a)

where L in mm, and R in mm.

2. The optical waveguide device for the touch panel according to claim 1, wherein said body is formed of an under-cladding material or a metal material.

3. A touch panel comprising:
   a display including a display screen; and
   an optical waveguide device including a body, a plurality of cores formed on a predetermined portion of a surface of the body, the plurality of cores including a light-emitting core and a light-receiving core, and an over-cladding layer formed on the surface of said body to cover the plurality of cores,
   said optical waveguide device being provided along a peripheral portion of the display screen of the display of the touch panel,
   said light-emitting core including an end surface positioned in a first side portion of the display screen of said display,
   said light-receiving core including an end surface positioned in a second side portion of the display screen of said display,
   said over-cladding layer including an end portion which covers each of the end surface of the light-emitting core and the end surface of the light-receiving core,
   said end portion of the over-cladding layer being formed as a lens portion,
   said lens portion including a surface formed as an arcuately curved surface in side view which bulges outwardly,
   wherein satisfied is $(L/2)-0.3 < R < (L/2)+0.3$ where L is a distance in millimeters from the end surface of each of said light-emitting core and said light-receiving core to the center of curvature of the arcuately curved surface in side view, and R is the radius of curvature of the arcuately curved surface in side view in millimeters.

4. The touch panel according to claim 3, wherein said body in the optical waveguide device is formed of an under-cladding material or a metal material.

\* \* \* \* \*